United States Patent [19]

Pilo

[11] 4,397,794

[45] Aug. 9, 1983

[54] ROTARY GAS WASHERS

[76] Inventor: Claes W. Pilo, Avenue inston Churchill 247, BTE. 26, B-1180 Bruxelles, Belgium

[21] Appl. No.: 328,398

[22] Filed: Dec. 7, 1981

[30] Foreign Application Priority Data

Dec. 11, 1980 [GB] United Kingdom ............... 8039705

[51] Int. Cl.³ ............................................. B01D 47/16
[52] U.S. Cl. .................................. 261/79 A; 55/230; 55/231; 261/89
[58] Field of Search ................... 261/88, 89, 90, 79 A; 55/230, 231, 92

[56] References Cited

U.S. PATENT DOCUMENTS 2,941,872 6/1960 Pilo et al. .
3,034,730 5/1962 Pilo et al. .
3,415,501 12/1968 Pilo .

FOREIGN PATENT DOCUMENTS 2400075 7/1974 Fed. Rep. of Germany ........ 261/89
859097 1/1961 United Kingdom .................. 261/89

Primary Examiner—Bernard Nozick
Attorney, Agent, or Firm—Cushman, Darby & Cushman

[57] ABSTRACT

A rotary gas washer with a droplet generator formed by a ring of radially extending blades mounted for rotation about a vertical axis as liquid is distributed over the blades so droplets are shed at the peripheral surfaces. A gas inlet scroll directs the inlet gas to an annular reaction space about the generator periphery. The outlet scroll is directly above the inlet scroll and connected thereto by a vertical duct having approximately the same diameter as the ring.

7 Claims, 25 Drawing Figures

ROTARY GAS WASHERS

The invention concerns improvements in and relating to rotary gas washers. In particular, it concerns gas washers in which liquid is accelerated by a generator including a ring of substantially vertical radially extending blades or wings mounted for rotation about a vertical axis, and flows radially outwardly from the outer edges of the wings through narrow spaces in a separately rotating rotor in countercurrent with a gas flowing radially inwardly. The word "generator" will be used in the following to include both rotating bodies in cases where there are two such bodies. Such washers serve two basic functions, namely to remove heat and soluble gases from the inlet gas and to remove dust and other particles of liquid or solid material entrained in the gas.

In order to reduce the pressure losses at the gas inlet, gas washers may be fitted with an inlet scroll radially surrounding the generator for the liquid. Gas is directed tangentially thereto so that, as the scroll imparts to the gas a radial component of velocity, the gas enters between the blades or wings of the generator with only small pressure losses.

It has been the practice to leave only a small clearance space between the radially innermost portion of the scroll and the periphery of the generator. One disadvantage of this is that the pressure and flow conditions around the generator and particularly in the region of this innermost portion, will not be uniform. For example, a pressure difference may be established between zones respectively in advance of and behind, with respect to the direction of rotation, this innermost portion. If in one angular region gas is washed less efficiently than in other regions, the overall mass transfer of the washer is seriously reduced.

Further, and perhaps of greater importance, liquid shed from the generator in the form of droplets is not available for heat and mass transfer in the region of the radially innermost portion of the scroll where only a small clearance space is provided.

By preserving an uninterrupted annular reaction space between the periphery of the generator and the wall, all the liquid shed from the generator is available for heat and mass transfer outside the generator and the conditions around the periphery of the generator can be made more uniform.

According to this invention in its broadest aspect, a method of washing a gas with a liquid, by causing liquid droplets to flow generally horizontally in counter-current with the gas, comprising establishing within an annular reaction space a flow of gas having both a tangential component and a radially inward component of velocity, accelerating the liquid and shedding the liquid into the space at a tangential velocity component having the same direction as the tangential velocity component of the gas such that the droplets of the liquid move radially outwardly in counter-current with the gas moving radially inwardly, both under the influence of centrifugal force.

Preferably, the liquid is accelerated by means of a rotating generator disposed radially within the annular reaction space, the liquid being shed in vertical streams of liquid droplets at the periphery of the generator.

Also according to this invention, a rotary gas washer comprises a casing in which is arranged a droplet generator including a ring of radially extending blades or wings mounted for rotation about a vertical axis and means for distributing liquid over the surfaces of the wings or blades so that during rotation liquid is accelerated by the blades and flows to the peripheral edge of the surfaces from where it is shed to form streams of liquid droplets, a gas inlet scroll for directing the inlet gas to flow around the generator with a radially inward component of velocity and having a height adjacent the generator substantially equal to or slightly less than the axial height of the generator, and a gas outlet scroll having an inlet above the generator, wherein the radially innermost portion of the peripheral wall of the inlet scroll is spaced from the periphery of the generator by a predetermined minimum distance to provide around the generator an annular reaction space within the scroll for interaction between the shower of droplets and the gas. The said axis may be vertical or horizontal or indeed may have some intermediate orientation, but in a preferred embodiment the axis is vertical.

Two or more gas washers may be arranged in cascade to form a multistage rotary gas washer, the generators conveniently being mounted upon a common shaft.

Preferably, the width of the reaction space is at least 20% and sometimes 50% of the radius of the generator.

It has been found advantageous for the improvement of heat and/or mass transfer between the liquid and the gas, to establish substantially uniform conditions around the entire reaction space. To this end I provide, at the outer periphery thereof a barrier, preferably in the form of a ring of guide vanes, to the outward flow of the stream of liquid droplets, the barrier having openings to admit the flow of gas having radially inward and tangential components of velocity. Such a barrier may be used to advantage in all cases except where the prime purpose of the washer or washer stage is dust removal.

In earlier washers, in order to reduce their overall horizontal dimensions, the casing surrounding the droplet generator was much greater in height than the droplet generator and extended above and below the level of the droplet generator. The force of liquid shed from the generator and travelling radially outwardly across the inlet scroll was such as to cause the gas to flow outwardly with, rather than against, the liquid shower and to cause the gas in the inlet scroll to approach the outer periphery of the generator mainly above and below the horizontal shower of droplets at the level of the generator. This prevents the gas from being washed efficiently in countercurrent by the shower of liquid droplets leaving the generator.

By providing an inlet scroll which has a height adjacent the generator substantially equal to the height of the generator, the radially inward flow of gas is confined to the same region as the radially outward flow of liquid, whereby the desired countercurrent washing of the gas by the shower of droplets is achieved. Preferably, the upper wall or roof of the inlet scroll is horizontal but the lower wall or floor is inclined slightly to the horizontal so that the scroll diverges in the radial direction. This has two advantages. Firstly, for a given cross-sectional area, the divergence enables the overall dimension of the scroll to be reduced. Secondly, liquid travelling across the scroll is subject to the earth's gravity and since the floor is inclined, the likelihood that liquid will collide with the floor is considerably reduced, thereby increasing the time during which liquid is available for gas washing.

The radially inward flow of gas, typically at 4 to 7 m/sec, is in opposition to a centrifugal force of, for instance, 20 g at the outer periphery of the generator. Gas is able to flow inwards through the generator but eventually the radial flow is halted and the gas starts to rise.

By providing an outlet scroll having an inlet which is located above the generator, the losses at exit are reduced. Even when the radially inward flow is halted, the gas retains its peripheral or tangential velocity and in fact, may be slightly accelerated by the ring of wings or blades so that the gas leaves the outlet scroll at a velocity substantially equal to its velocity at entry to the inlet scroll.

In a first embodiment the generator comprises a distributor for radially distributing liquid and a separately rotating rotor surrounding the distributor, both the distributor and the rotor having a ring of wings or blades. The rotor may be driven separately or be freely rotatable and driven by the impingement thereon of streams of liquid from the distributor. The wings or blades on the rotor (often referred to as contact plates) are closely spaced to define narrow passages for the countercurrent flow of liquid and gas, as described in my U.S. Pat. Nos. 2,941,872, 3,034,730 and 3,415,501. The contact plates have in some cases been substituted by filler bodies. Liquid is shed from the peripheral edges of the contact plates as a shower of droplets.

I have now been able to establish that, in this first embodiment, which has been developed for achieving a high rate of mass transfer and/or heat transfer in the narrow passages of the rotor, a considerable part of the washing effect takes place radially outside the rotor, where the gas is forced to enter the rotor periphery in countercurrent to the liquid leaving the rotor finely dispersed by the narrow passages and with freshly formed droplet surfaces.

In a second embodiment, therefore, I propose to dispense with the expensive and somewhat complicated rotor with contact plates (at large capacities there may be several thousand contact plates) or filler bodies and to substitute it with a ring or polygon comprising one or several, preferably radially spaced, vertical layers of wire net of substantially the same height as the wings and rotating independently outside the outer edges of the wings and around the same centre as the liquid distributor.

The mesh size of the net or nets will in most cases be between 3 and 30 mm. When several radially spaced rings of net are used, the radial distance between the rings will normally be between 1 and 15 cm.

This ring will in most cases rotate in the same direction as the liquid distributor but at a different, normally lower, speed and will when the speed is lower, be partly or wholly driven by the impingement upon its inner periphery of the sheets of liquid leaving the outer edges of the wings. The difference in speed between the distributor and the ring has in each case to be adjusted with regard to liquid quantity, liquid quality, etc. to give the best washing result.

This ring will within itself cause an important washing effect, but another important purpose with it will be to transform within a short radial distance the vertical sheets of liquid leaving the outer edges of the wings of the distributor, these edges being in most cases tangentially spaced 10 to 40 cm, into a fine and fairly homogeneous, nearly horizontal shower, leaving the outer periphery of the ring, against which shower the gas to be washed is forced by the suitable construction of the gas inlet scroll to pass inwards through the reaction space in countercurrent, thereafter continuing through the net or nets in the ring to enter the open space between the wings and turning upwards.

In a third and greatly preferred embodiment, I propose to completely dispense with the separately rotating rotor surrounding the distributor. Not only does this avoid manufacturing and other problems but, for a moderately larger housing, provides a larger annular reaction space for countercurrent flow of the gas and the liquid, at the same time as the reduction in the total washing effect according to this invention can be made small.

Embodiments of this invention will now be described by way of example with reference to the accompanying drawings of which:

FIGS. 14, 15 and 16 show three types of distributor wings;

Figure 1:
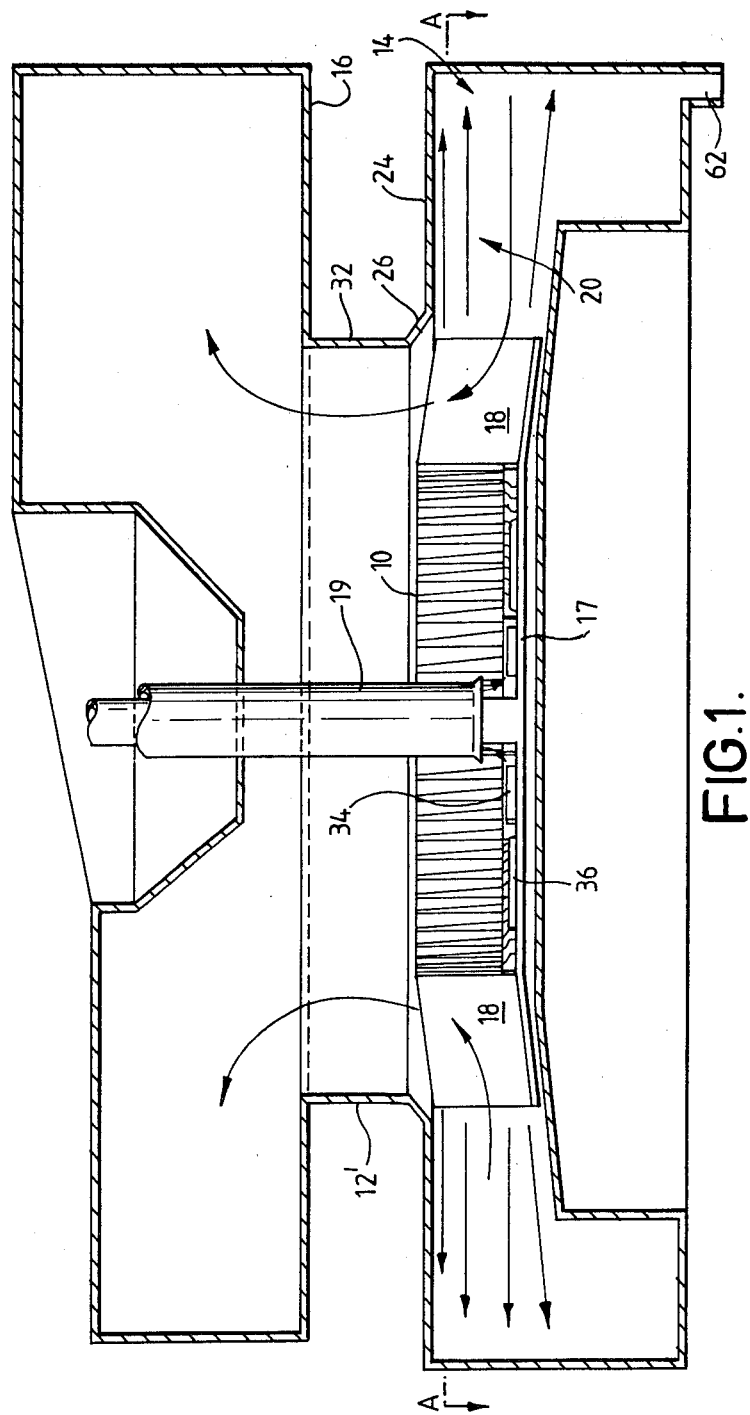
FIG. 1 is a part cross-sectional view of a rotary gas washer according to the second embodiment of this invention.
Figure 2:
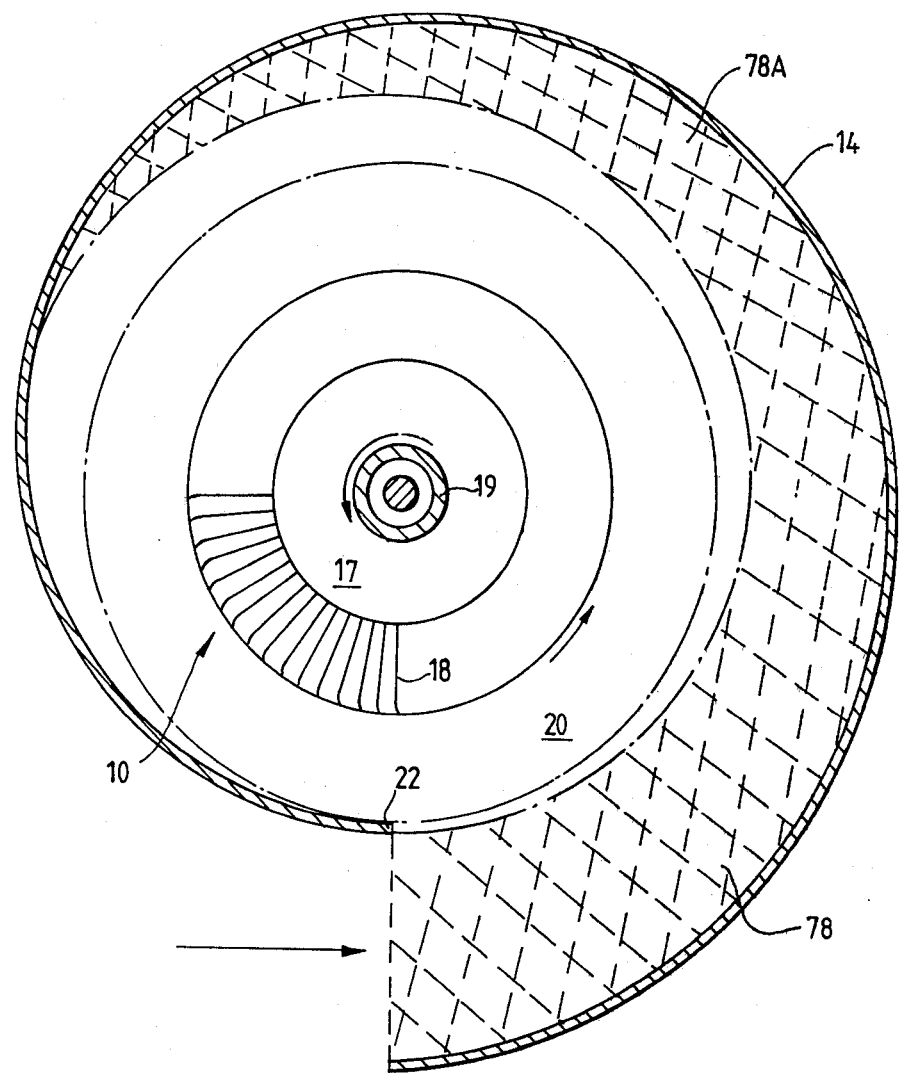
FIG. 2 is a schematic cross-sectional plan view taken on line AA in FIG. 1.

FIGS. 1 and 2 show a rotary gas washer having a liquid distributor 10 which is mounted for rotation within a casing 12' defining a gas inlet scroll 14 radially surrounding the distributor and a gas outlet scroll 16 above the distributor.

The liquid distributor 10 is a rotary table 17, for instance 8 m. in diameter including the wings and having many radially extending, substantially vertical wings 18 mounted upon and equally angularly spaced at, eg between 8 cm and 20 cm around the inner periphery of the ring of blades and between 15 cm and 35 cm around the outer periphery of said ring. Briefly, liquid delivered from a central pipe 19 onto the rotating table 17 flows outwardly under the action of centrifugal force, and is guided onto and spread over the surface of the wings 18 so as to flow radially outwardly over the entire axial height thereof from where it is shed into the reaction space 20 in the form of a stream or sheet of droplets. The distributor is described in more detail with reference to FIGS. 3 to 5.

In FIG. 2, an innermost portion 22 of the peripheral wall of the inlet scroll is spaced at a distance of 2 m. from the periphery of the distributor 10 thereby providing an uninterrupted annular reaction space 20 (indicated by the dot-dash line) around the distributor 10.

In FIG. 2, the inlet scroll 14 continues as a spiral up to the innermost portion 22 but, if desired, the final part of its length may be parallel with the periphery of the rotor or even divergent radially outwardly therefrom.

For high mass transfer, all the liquid entering the reaction space should have the lowest possible partial pressure of the substance to be washed from the gas and ideally should become nearly saturated. If part of the liquid does not become well saturated, then washing potential is wasted.

The spacing of the innermost portion 22 from the periphery of the distributor 10 makes available for heat and mass transfer liquid shed from the distributor in the region of the portion 22, which liquid, if only a small clearance space were provided, would be wasted.

In other words, liquid shed from the distributor 10 is available for heat and mass transfer around the entire periphery of the distributor.

A parallel reasoning must, however, be applied to the gas. Thus it is essential that all the gas meeting the liquid shed from the distributor should have the same high partial pressure of the substance to be washed from the gas, as it has when entering the washer. If this is the case, all the liquid will be saturated to the same degree.

From this fact the conclusion can be drawn that the type of washer shown in FIG. 2 is not ideal in cases where high mass transfer is desired. The whole quantity of the gas passing through the first part of the entrance spiral will be in its entirety washed by only that part of the liquid which is traversing the same first part of the spiral. The whole of the gas has therefore been washed by a part of the liquid. Further on in the spiral the gas will therefore have a considerably lower partial pressure of the substance to be washed out, but will further be washed by the same quantity of liquid per meter peripheral length of the annular reaction space, which liquid, when leaving the distributor, has the same partial pressure of the substance as the liquid supplied to the first part of the spiral.

This puts the whole washing process out of balance, as the liquid in the later part of the spiral will not meet a gas with the originally high partial pressure of the substance to be washed out. This part of the liquid will therefore not be saturated to the same degree as the liquid in the beginning of the spiral.

In other words, the partial pressure of the substance in the gas will decrease from the beginning to the end of the spiral, whereas the liquid, equally spread around the whole circle, will always meet the gas with the same partial counterpressure.

As will be described later in this patent application, it is a feature of this invention to form a homogeneous shower of liquid droplets some short distance outside the distributor. This is done by arranging a suitable difference in tangential velocity between the gas and the liquid, when they enter the reaction space respectively at its outer inner periphery. It is preferable, that this be done under the same conditions around the whole reaction space. This is, however, not possible to achieve in a washer according to FIG. 2. The liquid will in a washer of this type during its passage across the spiral flow in countercurrent with quantities of gas, in the beginning of the spiral all the gas, at the end of the spiral just a small part of the gas. Even if the difference in tangential velocity between the liquid and the gas is theoretically sufficient for the forming of a homogeneous shower, this will, therefore, not be achieved in a washer according to FIG. 2 because the process of exchanging tangential kinetic energy is out of balance in the same way as is described above regarding the process of mass transfer.

In order to avoid these inconveniences, an important feature of this invention is therefore to arrange the contact between the gas and the liquid so that it takes place only in the reaction space and at the same time in the whole of the reaction space, and this under the same conditions around the whole circumference of the reaction space.

This can in general be achieved by the introduction of the gas from above and/or from below with the desired tangential velocity into the outer part of the reaction space and/or into the space closely surrounding the reaction space.

A particularly interesting solution, however, is to introduce around the outer periphery of the reaction space a ring of vertical plates, so shaped and so arranged that the shower of droplets or an appreciable part of it cannot pass outside the ring, whereas the gas flow only to a small extent is disturbed by it. In this case the supply of gas to the reaction space may without inconvenience be made through a spiral surrounding the reaction space outside said ring.

Figure 3:
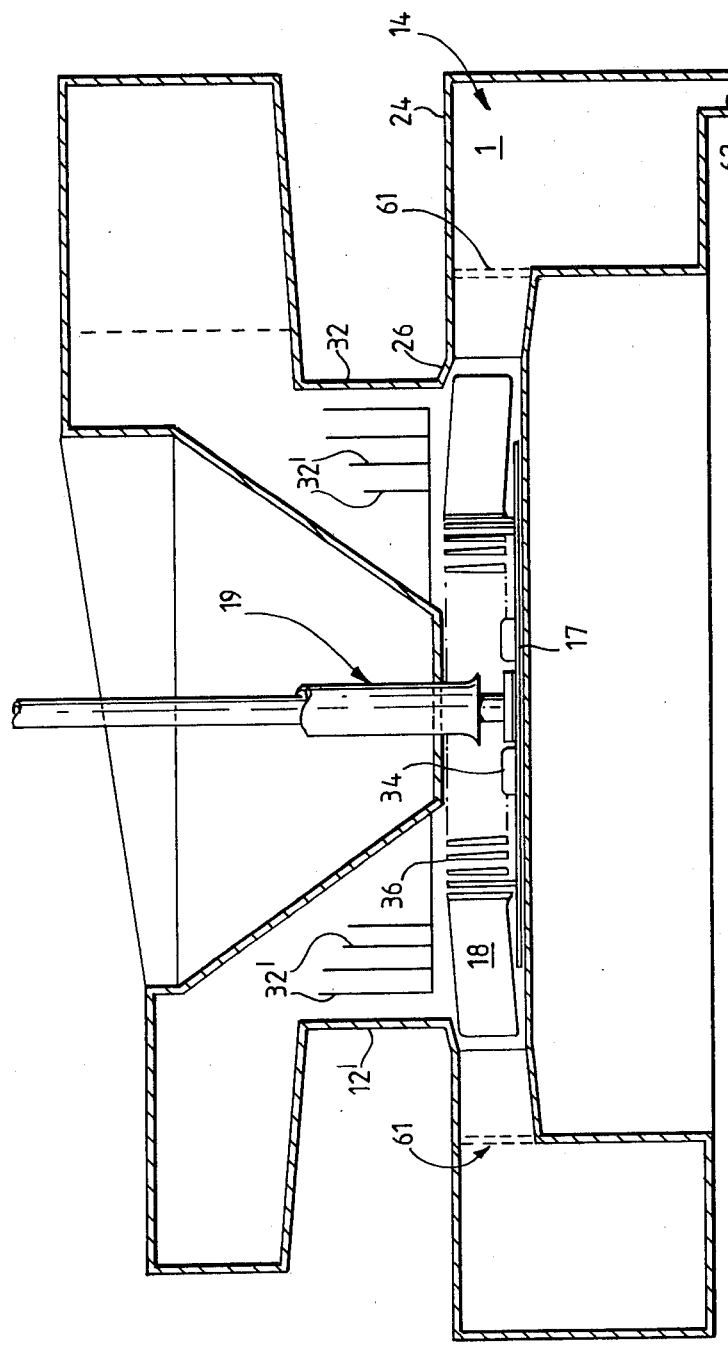
FIG. 3 is a part cross-sectional view of one type of the third embodiment of gas washer according to this invention.
Figure 4:
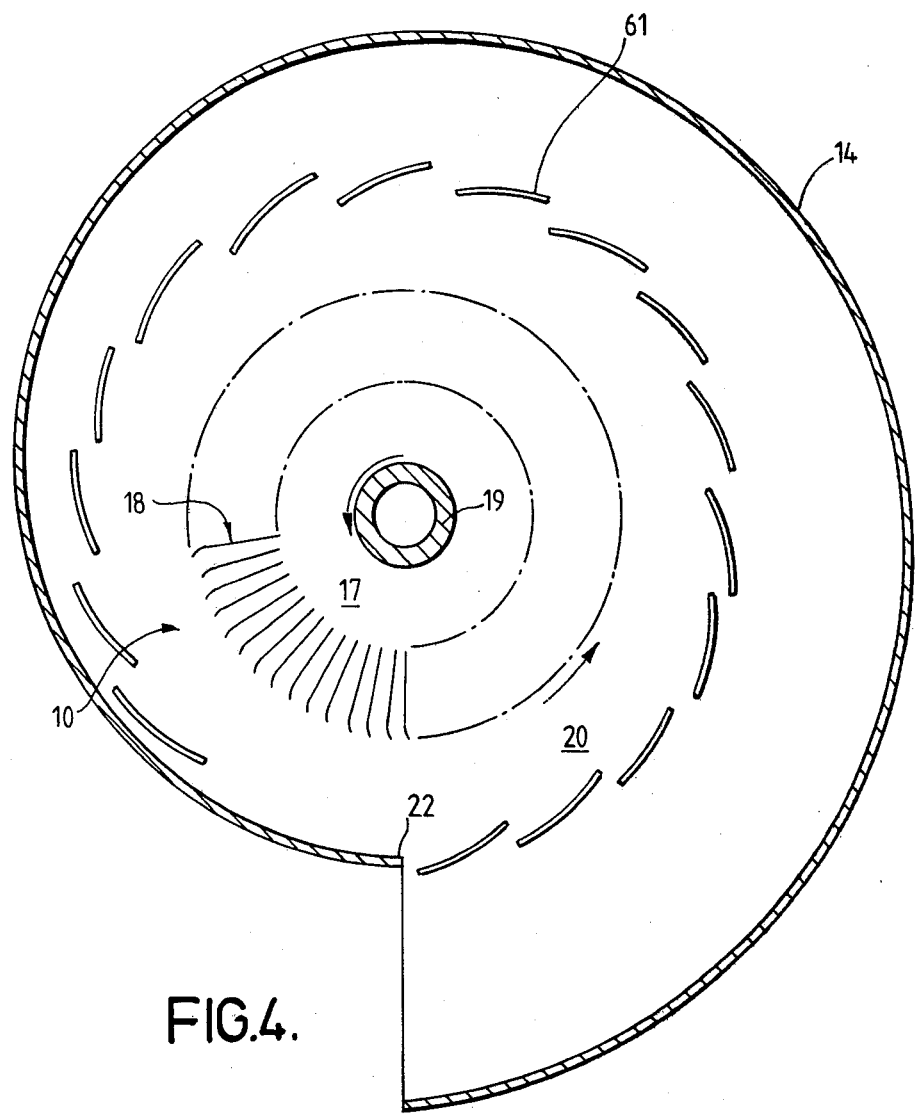
FIG. 4 is a view similar to that of FIG. 2 but of the embodiment of FIG. 3.
Figure 5:
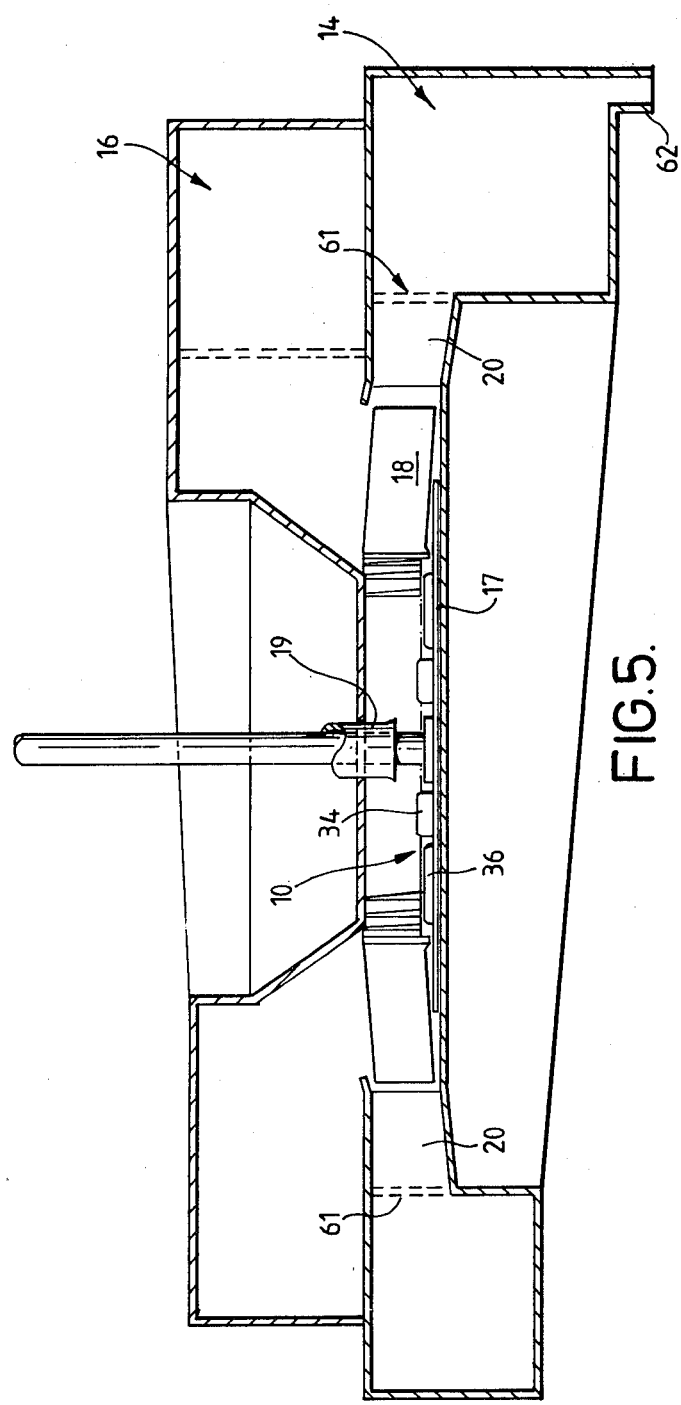
FIG. 5 is a part cross-sectional view of an embodiment similar to FIG. 3.

An important feature of this invention is therefore to arrange around the outer periphery of the uninterrupted annular reaction space a ring of vertical guide vanes 61 as in the embodiment of FIGS. 3, 4 and 5. These vanes may be straight or curved, as shown in the direction of the gas flow, in such a way that the gas has sufficient space to flow with little pressure loss into the annular space without considerably changing its peripheral velocity, and should be so arranged in relation to the flow of liquid droplets from the distributor that the droplets cannot flow out into the gas inlet spiral, but will coalesce upon the plates and flow down to the sloping floor of the housing, from which the liquid flows out through a pipe 62.

It may be advantageous in some cases where the washer has to treat different gas quantities, to arrange each of the vertical plates 61, FIG. 4, turnable around a vertical axis. In this way the velocity of the gas entering the annular reaction space through the spaces between the plates 61, may be regulated so that optimal washing conditions may be obtained.

These measures are especially important in the case of mass transfer and/or heat transfer. However, in cases where the main purpose is to remove solid or liquid particles from the gas, the theoretical basis for the washing process is different, and it may be advantageous to dispense with the vertical plates 61 (FIG. 4) and use a washer according to FIGS. 1 and 2. In this way also the whole gas entrance scroll will be used for the particle removal, which considerably increases the active washing volume. Numbers 78 and 78A show the washing zones for large respectively fine particles.

For a gas capacity of about 500,000 m³/hour, the distributor 10 has a wing height of 0.8 m and a radius of 4 m and rotates with a peripheral speed of 30 m/sec. to produce a centrifugal force of 23 g at its outer periphery. Gas enters the reaction space at its outer periphery with a tangential velocity component of 22 m/s, corresponding to a centrifugal force of about 8 g. By the interaction with the liquid shower it is accelerated to a tangential velocity component of 30 m/s, that is the same as the peripheral velocity of the distributor, and also by virtue of the shape of the reaction space from a radial velocity component of 4 m/s to say 7 m/s and thereafter enters between the wings 18 of the distributor 10. The height of the inner periphery of the reaction space 20 is the same or slightly less than the height of the distributor wings 18 adjacent thereto and the roof 24 is horizontal so that liquid is shed into the reaction space over its entire height, and the radially inward flow of gas throughout the reaction space is against the radially outward flow of liquid. Splashing is avoided by an inclined portion 26 adjacent the upper peripheral edge of the distributor wings 18.

The floor 30 of the reaction space and of the inlet scroll 14 slopes downwardly at an angle roughly given by the equation Tan $(\alpha \geq g/\text{centrifugal force})$ to compensate for the effect of gravity. Droplets of liquid do not, therefore, to a great extent collide with the floor but travel through the gas to the ring of vertical plates or to the periphery of the scroll, in the latter case, making all droplets available for dust removal in the entrance scroll. In addition, such geometry has the practical advantage of reducing the inlet scroll diameter and hence the space occupied by a washer for a given gas capacity.

The efficiency of dust removal can be further increased by arranging the temperature and pressure conditions of the gas and the temperature of the liquid such that the gas reaches its dew point in the outer part of the reaction space, or, when using arrangements according to FIG. 2, in the inlet scroll before entering the reaction space. Any dust or other particles in the gas will serve as condensation nuclei and increase in size and weight so that the likelihood of collision with droplets shed from the reaction space is increased and that they will move outwardly across the reaction space or the inlet scroll with the washing liquid.

The radially inward flow of gas is accelerated from for instance 4 m/sec at the periphery of the reaction space to about 7 m/sec at the outer ends of the wings and is being decelerated from 7 m/sec to zero in flowing through the space between the distributor wings. The gas then rises at a vertical velocity component of for instance 4 m/sec from between the distributor wings 18 as indicated in FIG. 1, all the while maintaining the tangential velocity of the distributor wings 18.

The radial length of the distributor wings 18 is about 40% of the outer radius of the distributor so that the annular area, when viewed in plan, occupied by the distributor wings constitutes 64% of the total area of the distributor. This percentage is selected to provide ample space for the gas to rise while limiting the velocity of upward gas flow to, say 4 m/sec. so that most droplets of liquid entrained in the gas are removed, under the action of centrifugal force, as the gas flows slowly upwardly through the cylindrical duct 32 and before they can be carried by the gas into the outlet scroll 16 disposed above the distributor 10.

On FIG. 3 is shown how the introduction of cylindrical surfaces 32' may be used to decrease the distance in radial direction the droplets have to fly in the gas before coalescing upon solid surfaces. If no cylindrical duct interconnecting the inlet and outlet scrolls is provided as in the embodiment of FIG. 5, droplets entrained in the gas are removed in the outlet scroll before the clean gas leaves the washer. In this latter embodiment, the outlet scroll has a base which forms part of the roof 24 of the inlet scroll 14 and is provided with a liquid outlet. Further, the cylindrical duct 32, if any, and the axial inlet of the outlet scroll 16 is disposed directly above the distributor and has a diameter roughly equal to its outer diameter. There is nothing to impede the upward flow of gas into the outlet scroll 16 and the gas is—still rotating—accelerated radially outwards by the centrifugal force to achieve a linear velocity at exit from the outlet scroll 16 of the same order as the velocity at inlet.

In passing through the washer, the gas is accelerated twice, radially inwardly to 7 m/sec. and upwardly to 4 m/sec. and in each case is decelerated to zero m/sec. This represents a loss in kinetic energy, but, because of the low velocities, this loss is small. As a result, the overall pressure drop through the washer is very low.

The economic importance of this is great because in, for example, a major power station a few centimeters (water gauge) of additional pressure drop in the stack gas will cost large sums. A washer such as described above can be expected to yield from 2 to 3 mass transfer units at a pressure drop of about 100 mm (water gauge), whereas the best of other types of large scale gas washer available at the present time gives less than 1 mass transfer unit at a pressure drop of above 300 mm (water gauge).

Figure 6:
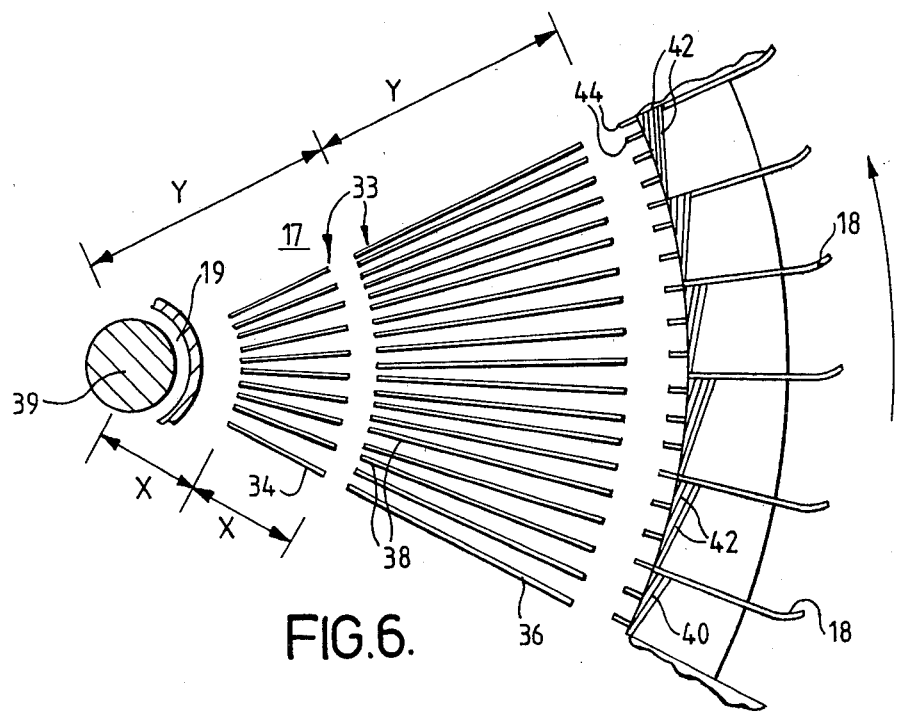
FIG. 6 is a plan view of part of the liquid distributor in the embodiments of FIGS. 1, 3 and 5.

In order to divide the liquid delivered from pipe 19 into streams of equal volume, the distributor has two or more rings of radial baffles 33, mounted on the rotating table 17, as shown in FIG. 6.

The baffles 33 in the inner ring 34 are taller than those in the outer ring 36 since the depth of liquid in the centre of the table is greater than elsewhere.

The baffles 33 define radial channels 38 and serve to smoothly accelerate the liquid as it travels radially outwardly along the channels. They are preferably taller than the expected depth of liquid in order to achieve maximum effect.

The inlet width of each channel 38 is half its outlet width and the inlet and outlet widths are the same for all channels. This is achieved by arranging the radially inner edge of each baffle 33 at a distance from the axis of rotation 39 equal to the radial length of the baffle; the baffles in the outer ring 36 thus being longer than those in the inner ring 34. There are twice as many baffles in the outer ring 36 than in the inner ring 34 and the width of a channel at outlet from the inner ring 34 is equal to the width of two channels at inlet to the outer ring 36, so that the liquid flowing through a channel in the inner ring 34 is divided between two channels in the outer ring 36.

Because of the tendency for liquid to flow along the trailing (with respect to the direction of rotation) side of the channel and to avoid supplying more liquid to one channel in the outer ring 36 than to another, the rings of baffles are spaced apart. This permits some rotation of the liquid relative to the table 17 and ensures that liquid is more evenly distributed. To further assist in obtaining an even distribution, the outer ring 36 of baffles 33 may be angularly displaced from the inner ring 34, but in the figure a channel in the inner ring is radially aligned with two channels in the outer ring.

Each of the distributor wings 18 has at its radially inner edge a guide plate 40 in which are formed grooves 42. There may be any number of grooves 42 but in the figure only four are shown for clarity. The guide plate 40 is shown inclined outwardly with respect to the axis of rotation 39 but may be vertical or even inclined inwardly. At the foot of the guide plates 40 are baffles 44 defining channels therebetween, each of which communicates with a groove 42. The interconnections between the channels and grooves 42 are bent upwards to produce a radius thereby allowing liquid to flow smoothly under the action of centrifugal force, into the grooves 42.

The grooves 42 end at the leading surface of the distributor wing 18 at different heights above the table 17. However, the kinetic energy of the liquid is great and the liquid has tangential and vertical components of velocity in relation to the wing and therefore has a strong tendency to flick from the grooves obliquely upwards out into the space between the wings.

This is undesirable since droplets of liquid may become entrained in the gas flowing inwards between the distributor wings. It has, however, another important disadvantage. A vertical velocity component of the liquid between the wings would tend to considerably increase the flow of liquid to the upper part of the wings with a corresponding decrease in flow to the lower part of the wings. This means considerably decreasing the washing effect of the washer.

Figures 7, 8:
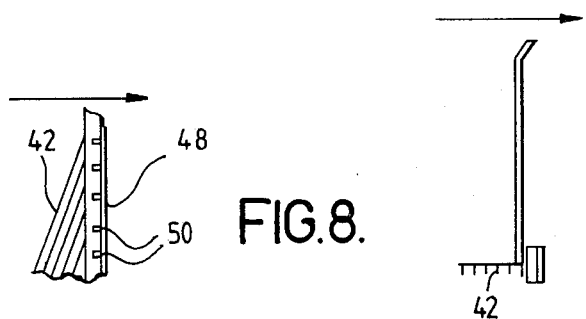
FIGS. 7, 8 and 9 show different sections of an individual distributor wing.

This can be avoided by mounting a vertical plate member 48 (FIGS. 7, 8 and 9) adjacent the forward side of the inner end of the wing and substantially parallel to the wing (the member 48 is not shown in FIG. 6 for clarity). On this member are fitted horizontal plates 50 positioned above the top of each groove 42, so that liquid is caught beneath the plates and directed horizontally onto the surface of the wing.

In this case the peripheral velocity component of the liquid in relation to the wing will be stopped by said vertical plate member 48, whereas its vertical velocity component will be stopped by said horizontal plates 50.

Figure 9:
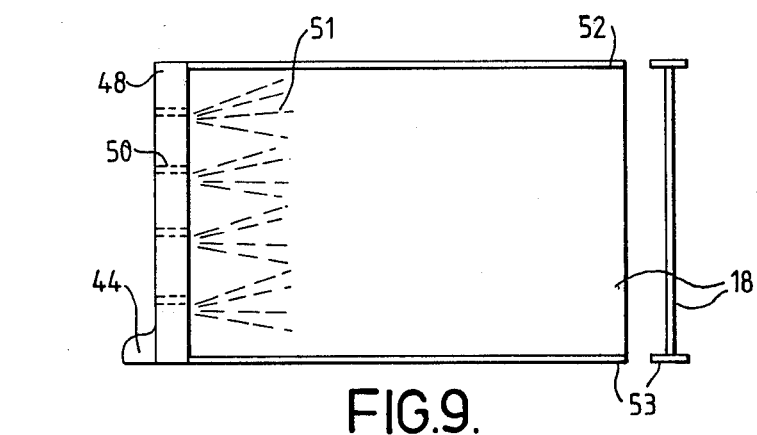

The streams of liquid 51 flowing from the grooves at different heights along the wing 18 are subject to a coriolis force which causes the streams to spread over the entire surface of the wing as indicated in FIG. 9. At the radially outer edges of the wings liquid is shed along their entire height into the reaction space 20. Further, because the liquid flows onto the surface of the wings in streams of substantially equal volume, liquid shed from the wings is evenly distributed over the height of the reaction space.

The wings 18 are formed from thin metal or plastic sheets and to avoid deflection of the wings, flat or angle metal beams 52 and 53 may be fitted respectively along the top and along the bottom of the wing and even between the top and the bottom. The beams are supported from the table 17 by any suitable means. Another purpose served by the beams 52 and 53 is to prevent the shedding of liquid from the top or bottom of the wing.

The same purpose may be served by bending for instance 5-10 mm of the upper and the lower border of the wing forwards in the direction of the rotation. Also this measure will stiffen the wings and stop liquid from flowing upwards and downwards.

Figure 10:
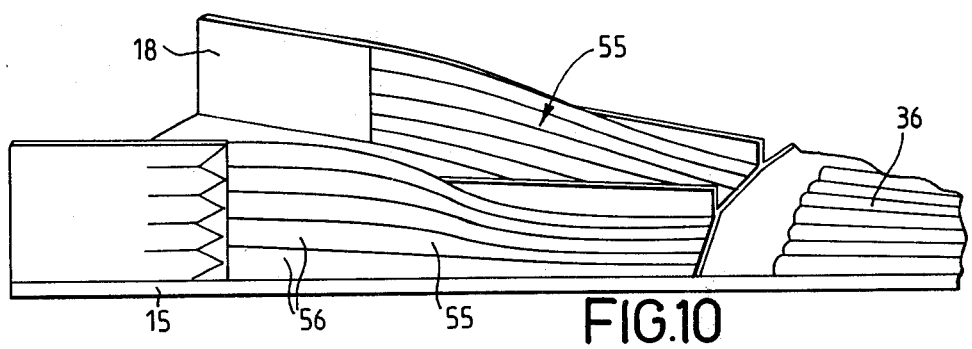
FIG. 10 is a schematic view of another embodiment of liquid distributor.
Figure 15:
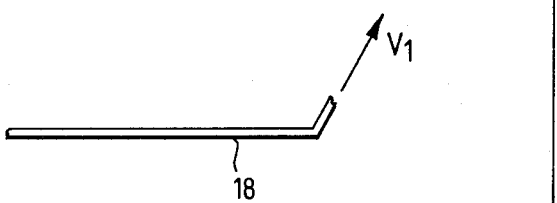
FIG. 15 shows for rotor fixed system a relative velocity diagram for the case where the tangential velocity of the gas is greater than the tangential velocity of the rotor.

FIG. 10 shows an alternative method of guiding liquid from the channels in the outer ring 36 onto the leading surface of the wings 18. One end of a strip 55 is vertical and attached to the wing 18. The strip 55 has grooves 56 extending along its length and terminating at the leading surface of the wing 18. The strip is twisted and its radially inner end is laid flat on the table, the grooves 56 being aligned with channels in the outer ring 36 of baffles 33. Because of the smooth curvature of the strip 55 and hence of the grooves 56, liquid flows smoothly and without splashing under the action of centrifugal force and coriolis force and onto the surface of the wing. The liquid should, however, be broken by arrangement at the ends of the wings according to for instance FIG. 15.

Figure 11:
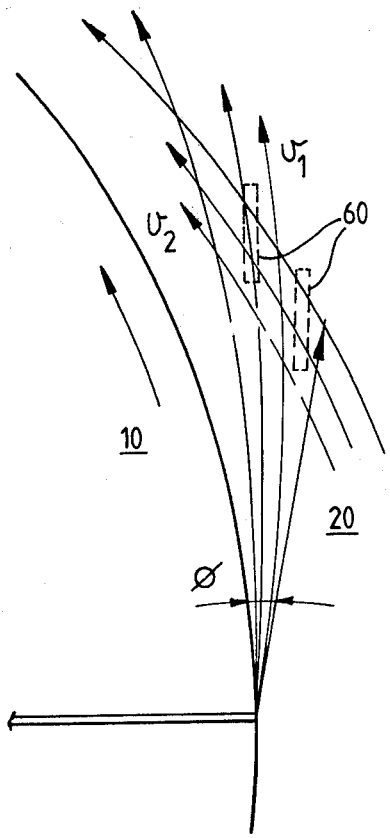
FIGS. 11 and 12 show relative velocity diagrams of the liquid/gas countercurrent flow pattern for the case where the tangential velocity of the gas at inlet is less than the peripheral velocity of the rotor.
Figure 12:
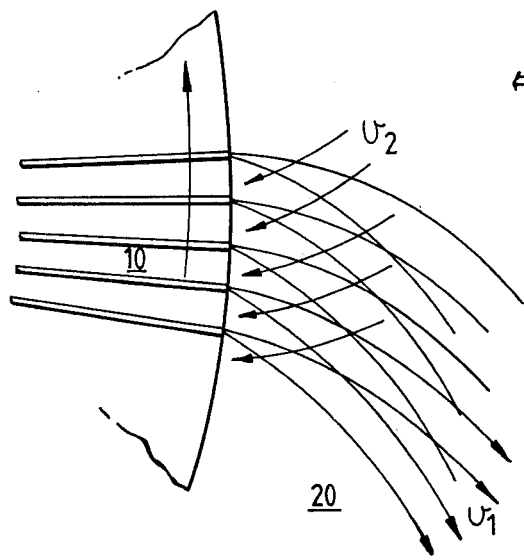

It is an important feature of this invention that a homogeneous countercurrent flow of the liquid and the gas is achieved by controlling the tangential velocity component of gas in the reaction space and the inlet scroll to be different from the peripheral velocity of the distributor and hence the tangential component of velocity of the liquid leaving the distributor wings. In the above described embodiment of this invention, the tangential velocity component of the gas is less than the peripheral velocity of the rotor and FIG. 11 shows a relative velocity diagram for this situation in which the housing is the fixed point, and FIG. 12 is a similar diagram in which the rotor is taken as the fixed point. It should be noted that on the FIGS. 11, and 12, the radial extension of the contact zone seems to be smaller in relation to the radius of the rotor than often will be the case in practice. For the sake of clarity, the divergent streams of liquid droplets have also been shown longer than in most practical cases, which can be seen if comparing with the flow on FIG. 20. It will be appreciated that at a certain distance outside the wings there is substantially a homogeneous countercurrent flow of the liquid ($V_1$) and gas ($V_2$) and that this homogeneous countercurrent flow will prevail outside of this distance.

Figure 14:
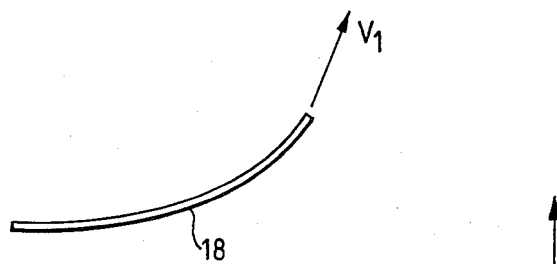
Figure 16:
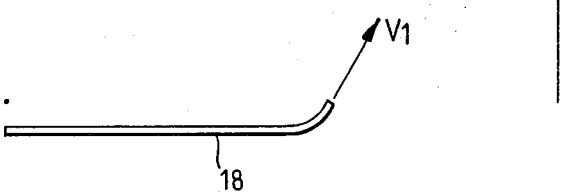

With reference to FIG. 11, it is preferred that in a fixed system, the angle between the liquid flow leaving at the velocity $V_1$ and the tangent to the distributor be less than 45° and to this end the blades or wings may be curved so that the peripheral edges lead the radially inner edges in the direction of rotation (FIG. 14) or has an angled (FIG. 15) or curved (FIG. 16) peripheral edge. This has the effect of reducing the radial component and increasing the tangential component of the liquid velocity $V_1$ without significantly affecting the gas flow.

In some cases it is desirable to control the tangential velocity of the gas to be higher (say 30-50 m/sec) at inlet than the peripheral velocity of the distributor (say 20 m/sec). One advantage of this is that the centrifugal force in the outer part of the reaction space will be higher, thereby improving dust removal. Another advantage is that the necessary cross-sectional area of the inlet scroll is much reduced.

Figure 13:
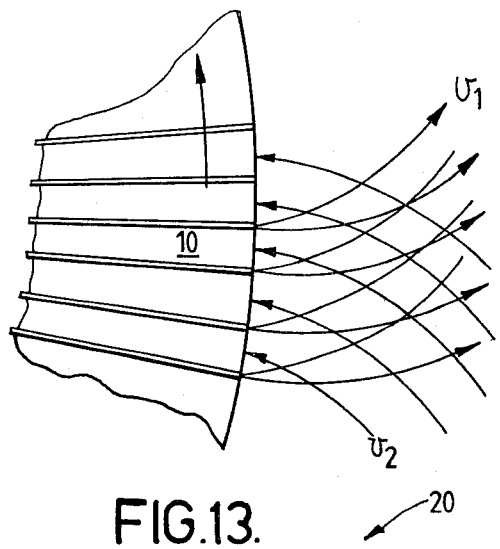
Figure 17:
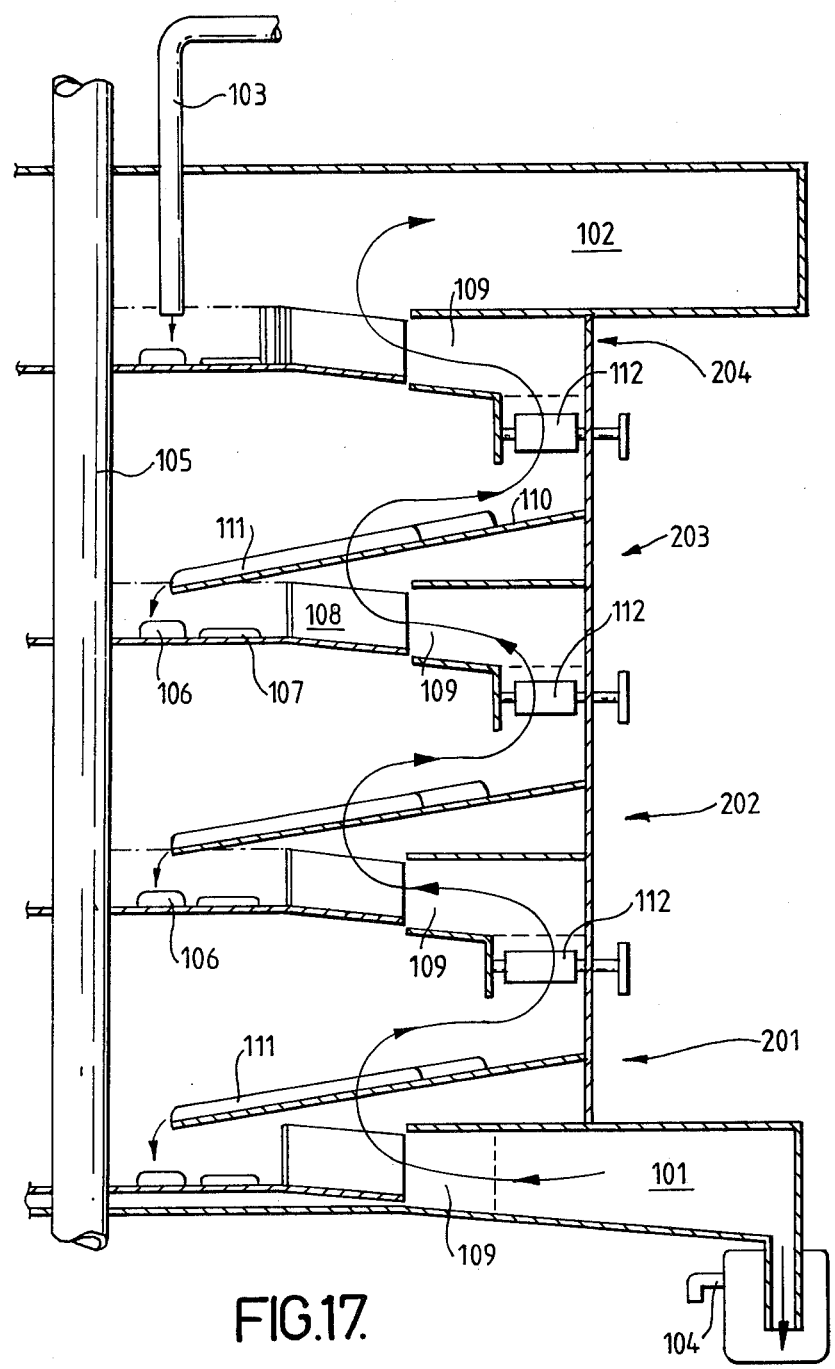
FIGS. 17 and 18 show a four stage gas washer in which both gas and liquid flow through the four stages.
Figure 18:
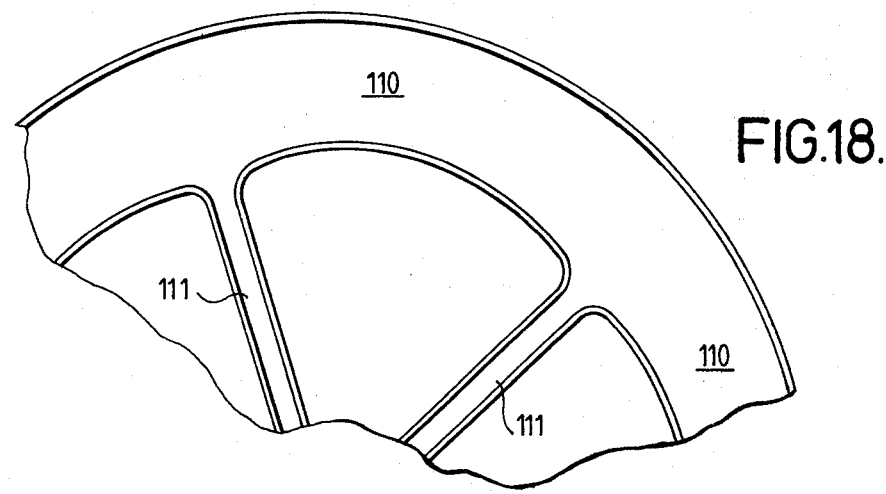
Figure 19:
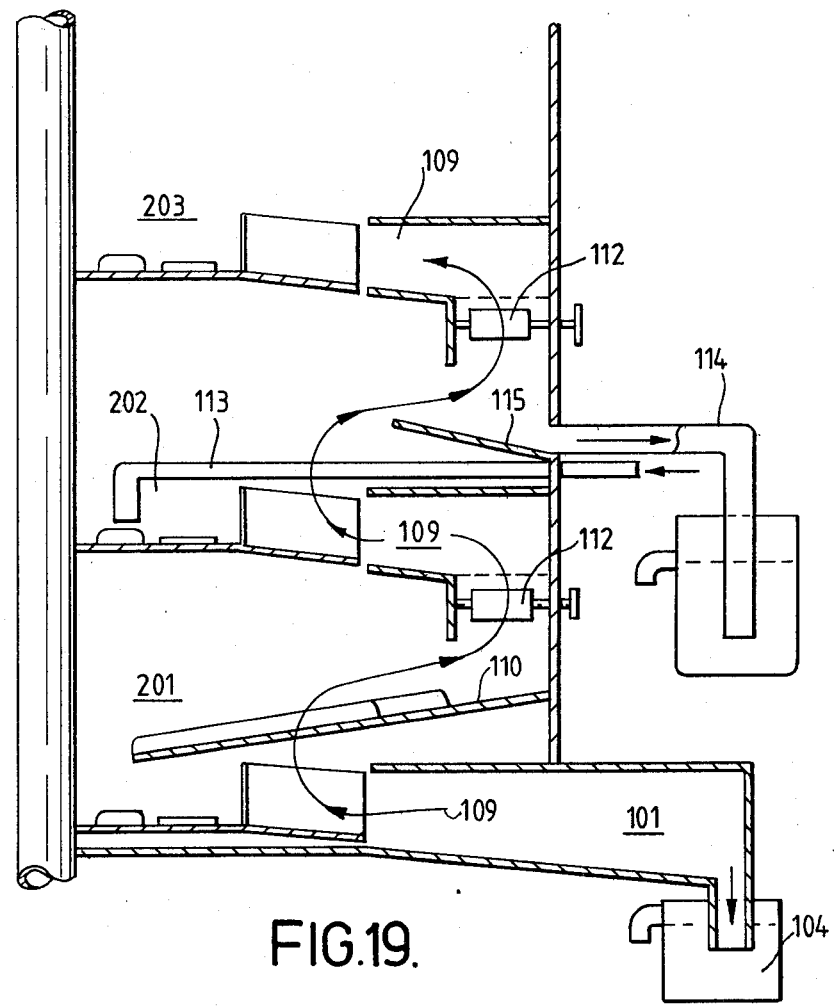
FIG. 19 shows a modification of the embodiment of FIGS. 17 and 18 enabling the liquid to be changed between stages.

FIG. 13 is a relative velocity diagram in which the distributor is taken to be the fixed point and for the case where the gas velocity $V_2$ is greater than the peripheral velocity $V_1$ of a liquid droplet at the periphery of the distributor.

As described above, liquid is shed from the distributor wings as sheets or streams of droplets spaced apart by, say 20 or 40 cm. Because the droplets differ widely in size, the influence of the gas flow will affect droplets differently depending upon the droplet size. This causes a spreading of the streams and adjacent streams mix to establish a homogeneous mist of droplets flowing outwardly from the distributor in countercurrent with the gas flowing inwardly.

As the gas travels around the inlet scroll and the annular contact zone, it is either accelerated or decelerated to the peripheral speed of the distributor so that the velocity differential which spreads the streams of droplets reduces eventually to zero. In order to delay this, that is, to maintain a velocity differential, the gas may be introduced into the scroll in a number of separate streams at different locations around the scroll. When the tangential velocity of the gas is to be higher than the peripheral speed of the rotor, the separate streams are directed to accelerate the flow of gas in the scroll. When the tangential gas velocity is to be less than the peripheral speed of the rotor, the separate streams are directed somewhat transversely to the gas flow to act as a brake.

Tests have shown that the size of droplets leaving the outer periphery of the generator and meeting a countercurrent flow of gas, is dependent, among other things, upon the shape of a peripheral edge portion of the radially extending wings or blades.

If, when the wings or blades are manufactured, they are cut off roughly squarely, there will be a rough narrow surface which is broadly speaking parallel to a tangent to the periphery of the liquid distributor. Under the influence of the adhesion to this narrow surface at the edge of the wing or blade and of the liquid surface tension, liquid dwells on the surface for a moment and a droplet grows until the centrifugal force on the droplet is sufficient to overcome the adhesion and surface tension forces acting on the liquid and carry the droplet away.

There are many other factors governing the formation of a droplet such as the surface tension and the viscosity of the liquid, the velocity and nature of the entering gas and the nature of the flow of the liquid over the wings or blades. In practice, therefore, a wide range of sizes of droplets are formed. The droplet size can be reduced by adding a surfactant.

According to yet a further aspect of this invention, in a rotary gas washer of the type hereinafter defined or according to different embodiments of this invention, the radially outer edge portion of the wings or blades may be so treated or formed as to cause droplets of liquid to be more readily shed and thereby to produce generally smaller droplets of liquid. Preferably, this is achieved by reducing the thickness of a peripheral edge portion of the wings of the distributor and/or the blades of the separately rotating rotor. The peripheral edge portion of the plates may be sharpened and/or, if desired, the edge portions may be serrated, thereby to produce a plurality of points or lands along the said edge portions.

The important practical advantage of reducing the droplet size can be illustrated by the following example.

Assuming the droplets to be substantially spherical, then if the diameter of droplets can be reduced by one half, the number of droplets formed from a given quantity of liquid is increased to eight times the original number. This gives rise to a substantial improvement in the efficiency of dust removal especially with regard to small particles.

In addition, the total surface area of 8 times the number of droplets is twice the original surface area and this results in a considerable increase in mass transfer and/or heat transfer between the gas and the liquid. At the same time mass transfer and/or heat transfer will be further increased because the average depth of penetration for effective mass and heat transfer is reduced when the droplets are one half the original diameter.

Referring now to FIG. 17 which shows a four stage gas washer, each of the four stages has a liquid distributor, such as described above, with particular reference to FIGS. 17, 18 and 19.

The four distributors are mounted for rotation upon a common shaft 105 within a common housing having at the bottom a gas inlet scroll 101 and at the top a gas outlet scroll 102.

Liquid is delivered onto the table of the uppermost distributor by an inlet pipe 103 and flows downwardly through the housing to a liquid outlet 104. At the outlet of each of the stages 204, 203 and 202 (except the lowest (first) stage 201) liquid falls onto a collector 110, see FIG. 18, which, in the region of its outer periphery, is conical so that liquid flows down into radially extending channel shaped arms 111 from which it flows onto the rotating table 106 of the distributor beneath.

Gas flows upwardly through the housing along the path indicated and is in each stage accelerated by the liquid flowing from the distributor. It is desirable to maintain a differential between the tangential velocity of the gas entering the annular reaction spaces 109 and the peripheral velocity of the distributor. To this end, a number of baffles 112 are provided around the periphery to brake the gas as it flows upwardly from one stage to the next except when the gas is required to flow faster than the liquid, in which case the baffles are directed so as to import an increased tangential velocity component to the gas.

The above description refers only to a negative differential, that is to say, the tangential velocity of the gas is required to be less than the peripheral velocity of the distributor. It is, however, feasible and in certain circumstances, desirable, to use a gas velocity higher than the peripheral velocity of the distributor. In such a case, the baffles 112 will have to be substituted by guiding vanes, which increase the tangential velocity component of the gas, before it enters the outer part of the reaction space 109. It is thought that to allow the gas to accelerate the liquid, also will assist the formation of homogeneous distribution of droplets in the reaction space. Further improvement will accrue if the gas flow is highly turbulent at a velocity of say 30–50 meters per second.

The modified gas washer shown in FIG. 19 also has four distributors mounted for rotation upon a common shaft, (only the lower three stages 201, 202 and 203 are shown). The gas flows upwardly through all four stages but fresh liquid is introduced at liquid inlet 113 to stage 202. Liquid from stage 203 is collected by a collector 115 and flows to a liquid outlet 114.

A washer such as shown in FIG. 19 enables the two lower stages to be used exclusively for dust removal or other pre-washing processes, the liquid used for dust removal being, if desired, different to the liquid used in the upper stages for washing of the gas.

One basic feature of the method according to this invention is the transformation already in the inner part of the reaction space of the sheets or jets of liquid leaving the rotating liquid generator, into a shower with smaller and bigger droplets evenly dispersed in the gas.

Figure 20:
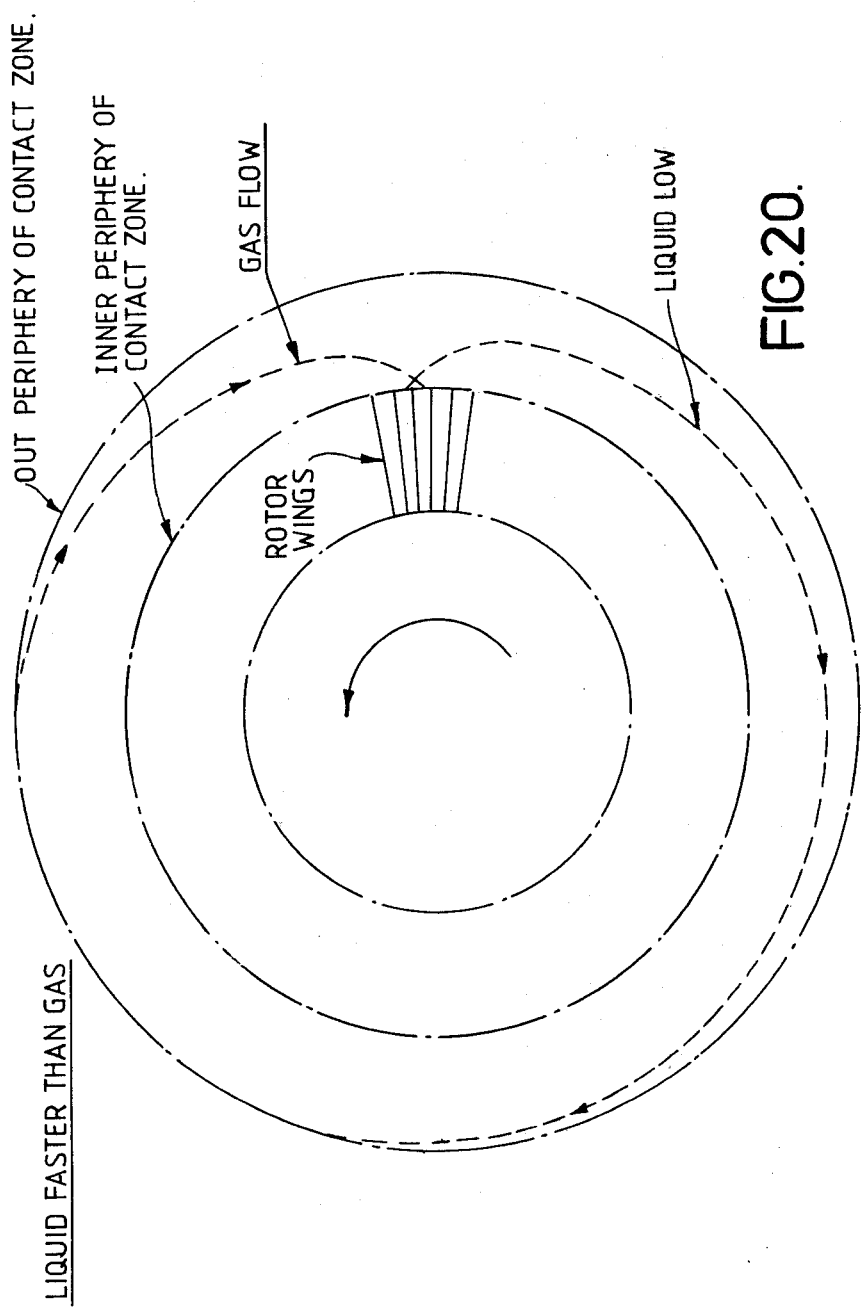
FIG. 20 is a flow diagram showing the trajectories of a liquid droplet and of a gas molecule in a rotary gas washer such as shown in FIGS. 3, 4 and 5 for the system liquid faster than gas.
Figure 21:
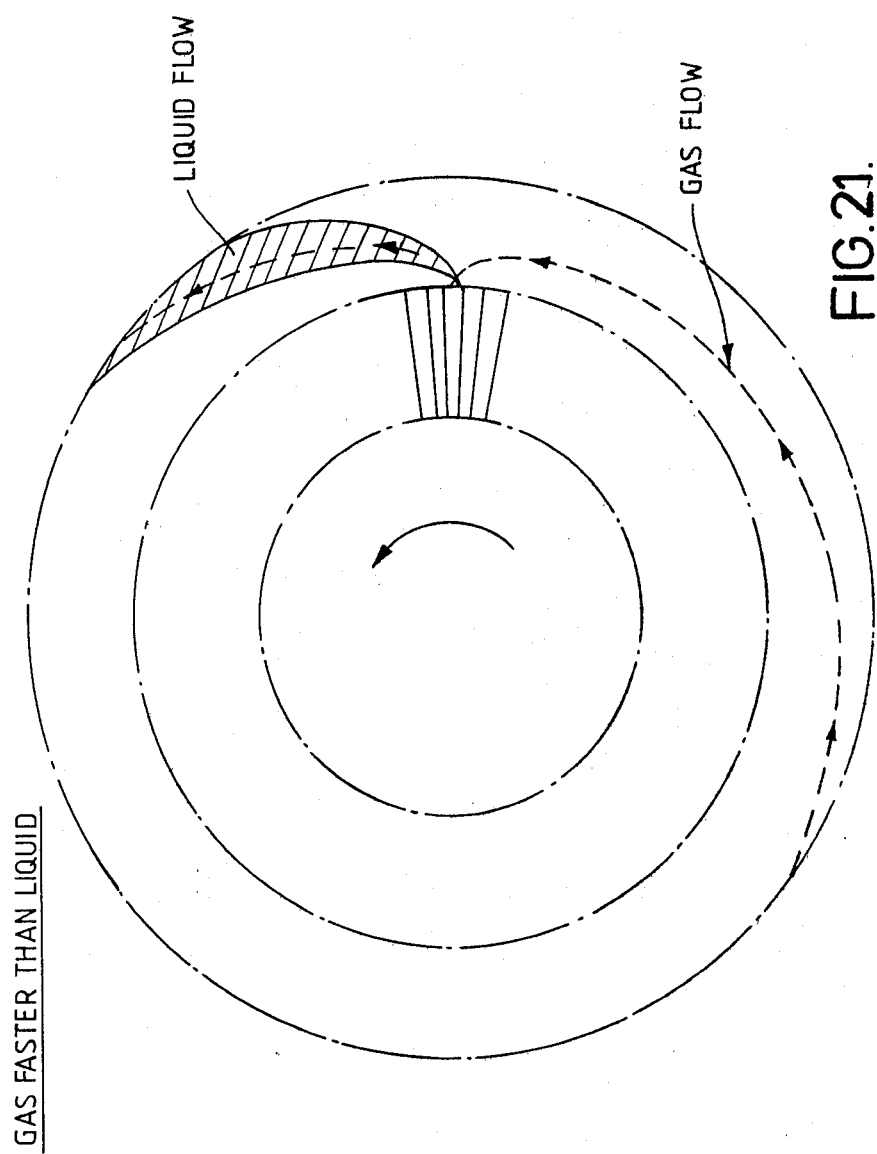
FIG. 21 is a flow diagram showing the trajectories of a liquid droplet and of a gas molecule in a rotary gas washer such as shown in FIGS. 3, 4 and 5 for the system gas faster than liquid.

In FIG. 20, the spiral marked "Liquid flow" represents the trajectory of one small droplet from the moment it leaves the outer periphery of the generator rotor. If the trajectories of all the droplets leaving the same "wing" of the rotor during, for instance, 1/100 of a second had been shown on the drawing, that would have resulted in a divergent stream as shown on FIG. 21, bigger droplets arriving earlier to the outer periphery of the reaction space than the spiral marked "Liquid flow" and the smaller droplets later.

If one considers that for a large washer unit having a liquid distributor with for example, 100 to 150 wings and rotating at say one rev/sec., 100 to 150 jets or sheets of liquid pass a fixed point in the reaction space each second, it will be appreciated that the supply of liquid is almost continuous already close to the inner periphery of the reaction space, and that a little further outside the distributor—because of the difference in peripheral velocity between the gas and the liquid, and also because of the difference in radial and peripheral velocity between droplets of different sizes—a homogeneous rotating shower is formed, moving substantially horizontally, radially outwards in the reaction space in countercurrent with the rotating gas moving inwards.

It is preferred that the liquid shower and the gas have a tangential velocity component of the same direction but of different size. If it is so arranged, that this component is greater for the liquid than for the gas, which often may be the case, the bigger droplets will move tangentially faster relative to the gas, than the smaller droplets, the latter being to a greater degree, braked by the slower moving gas.

As regards the radial velocity components, they are in opposite direction for the gas and the liquid. That means, that also in this case and because of the centrifugal force, even to a greater extent than in tangential direction, the bigger droplets move faster than the smaller ones.

I conclude that it is essential for this invention: that during the whole passage of the shower outwards through the reaction space there is a continuous mixing going on between droplets of different sizes and this in radial as well as tangential direction.

These two interactions between the gas and the shower of droplets, causing the homogenization of the liquid shower, are both working in the horizontal plane. There is, however, a third interaction contributing to the homogenization, which is working in vertical direction as well, and this is caused by the turbulence of the gas.

The gas enters the entrance spiral of the washer with a well developed large scale turbulence. In the embodiment according to the FIGS. 1 and 2 this turbulence continues around the whole washer, but it gradually decreases, as the gas approaches the outer periphery of the distributor, and this as a result of the interaction in vertical as well as horizontal direction between the liquid shower and the gas.

In spite of the measures taken according to the FIGS. 6, 7, 8 and 9 there may be cases where the liquid at the outer edges of the wings is not spread quite uniformly over the whole height of the wings. In such cases this vertical interaction between the liquid shower and the gas is of considerable importance for the formation of a homogeneous liquid shower.

Also in cases, where the embodiment according to the FIGS. 3, 4 and 5 is used, the turbulence in the entrance spiral is well developed. However, when the gas passes the ring of vertical, slightly bent plates 61, where the openings between the plates, through which the gas passes, may be for instance 400 to 600 mm, the turbulence will be somewhat reduced horizontally in right angle to the gas flow.

In the direction of the gas flow, however, and, what is perhaps more important, in vertical direction the turbulence will not be directly impeded by the vertical plates. This will have as a result, that also when using this embodiment, there will be in the reaction space a vertical interaction between the turbulent gas and the mist in addition to the two horizontal ones, all contributing to bring about a homogeneous shower for the working process.

When the shower moves outwards with a tangential velocity greater than that of the gas, its average tangential velocity decreases, as it approaches the outer periphery of the reaction space, where the gas enters with relatively low tangential velocity. At the same time, the radius for the rotation of the droplets around the centre of the washer increases when they are moving outwards from the inner part of the reaction space. Both these changes reduce considerably the centrifugal force. By way of example: if the centrifugal force is about 27 g at the outer periphery of the rotor, corresponding to a tangential velocity of about 40 m/s at a radius of 6 m, it may be of the order of 5 g just inside the outer periphery of the reaction space, corresponding to a tangential velocity of about 20 m/s at a radius of 8 m.

Figure 23:
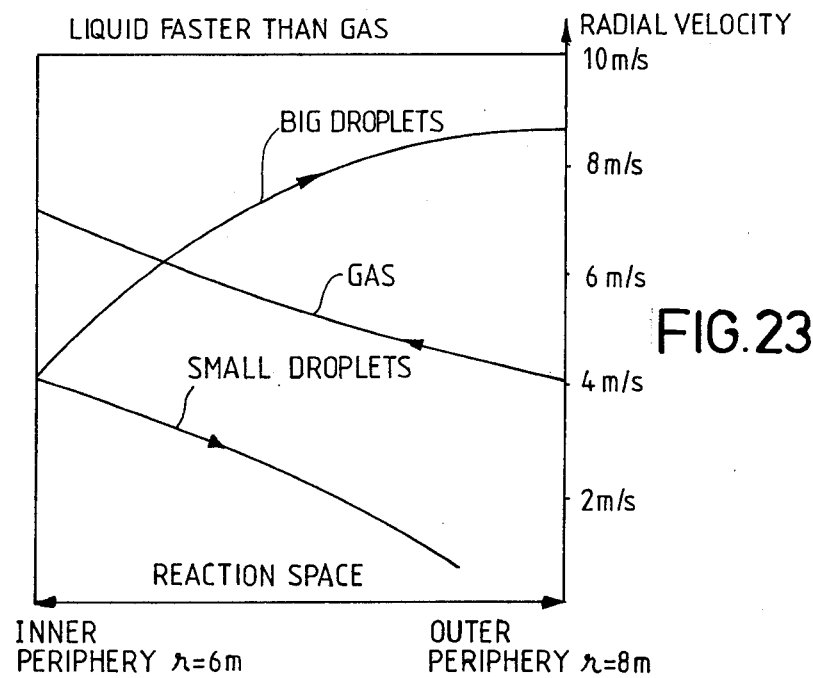

I conclude that at the inner part of the reaction space where the centrifugal force is high, even rather small droplets will move outwards against the gas flow. The situation changes, however, for such small droplets, when the centrifugal force falls to, for instance, 15 g and further to 5 g. While their tangential velocity components remain relatively high, as they are influenced by the tangential gas flow, their radial velocity components are rapidly decreasing with the decreasing centrifugal force, as can be seen on FIG. 23, until most of these small droplets are overtaken and hit by bigger, fast flying droplets, with which they coalesce. Every such clash will stir the liquid inside the two droplets, and the resulting bigger droplets will have new fresh liquid close inside its surface. It is evident that this will considerably increase the washing efficiency.

The fact that the centrifugal force will be lower at the outer part of the reaction space may, however, in some cases, be a disadvantage. This may for instance happen, when it is the question of the removal of very fine dust. It is therefore an important feature of this invention, that the washing method may be changed, so that the centrifugal force at outer and inner periphery of the reaction space will be of about the same size. It is even possible to arrange for the centrifugal force to be considerably higher at the outer periphery than at the inner one. It is easy to understand, that the dust entering the outer part of the reaction space with the gas, which is itself under the influence of a strong centrifugal force, will not easily move radially inwards against the violent liquid shower, when the only force pushing it inwards is the radial velocity component of the gas of only 4–5 m/s.

This may be achieved by introducing the gas at the outer periphery of the reaction space at a higher tangential velocity component than that of the liquid leaving the outer periphery of the rotor. The droplets of the shower will thus, when passing the reaction space, follow a trajectory outwards, which is curved forwards in the direction of rotation as a result of their acceleration in tangential direction as may be seen on FIG. 21. When arriving at the outer periphery of the reaction space the droplets, especially the smaller ones, will therefore have a tangential velocity not very much lower than that of the entering gas.

This effect will at first seem unlikely or in any case impractical, as it is usual practice to move a gas by a liquid jet or shower and not the contrary. With this invention, however, because of the intimate contact achieved between the two media, the weight proportion between the liquid and the gas, needed for a good washing effect, may be kept low and will seldom exceed two.

If it is assumed, for instance, that the gas enters the outer periphery of the reaction space with a tangential velocity component of 50 m/s, and that the liquid enters the inner periphery with a tangential velocity component in the same direction of 35 m/s, it is clear that good conditions would be present for an efficient transfer in countercurrent of kinetic energy from the gas to the liquid.

The result by arranging the flow in this way in a reaction space with inner radius 6 m and outer radius 8 m and with a proportion of for instance about 2 kg liquid per m³ gas is to generate a centrifugal force at the inner periphery of the reaction space of about 21 g whereas the centrifugal force at the outer periphery is about 32 g for the gas and, as an average, around 26 g for the liquid, corresponding to an average tangential velocity of about 45 m/s.

It should be mentioned, that this principle, gas tangentially faster than liquid, will show a moderately higher energy consumption than the system, liquid tangentially faster than gas.

Figure 22:
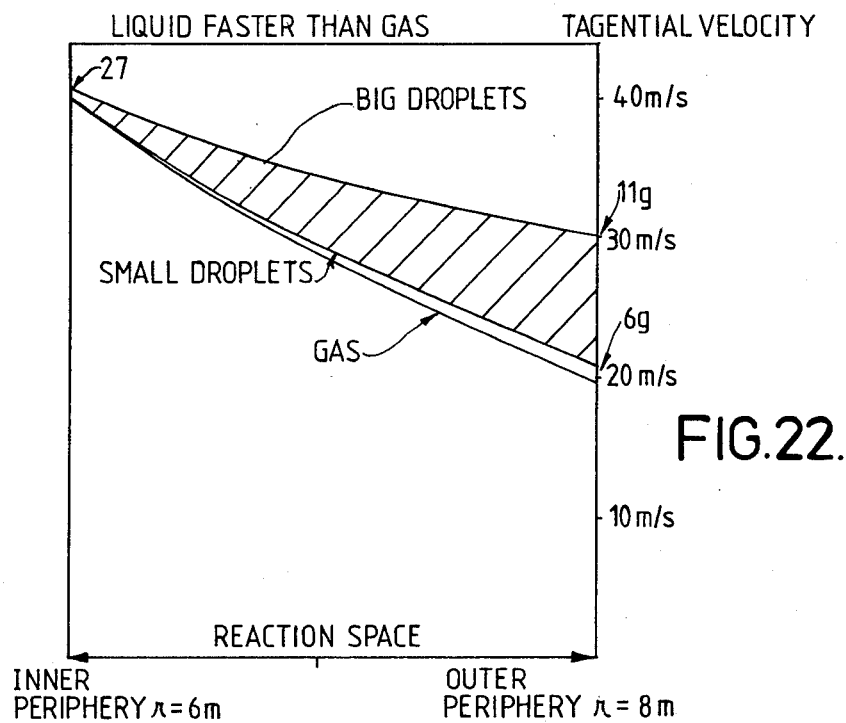
FIGS. 22 and 23 are diagrams respectively of the tangential and radial velocity profiles across the reaction space for the system liquid faster than gas.
Figure 24:
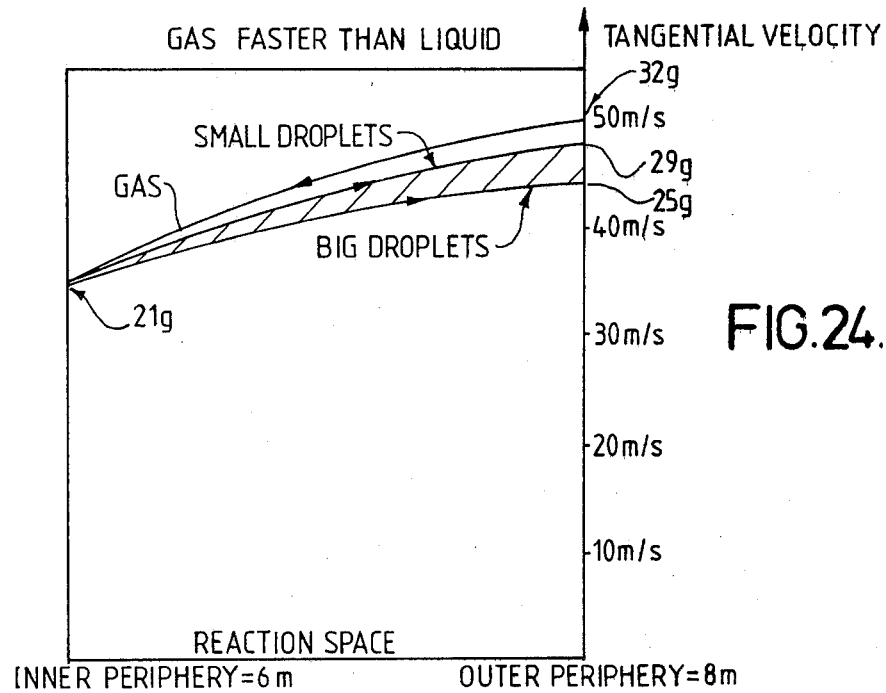
FIGS. 24 and 25 are diagrams respectively of the tangential and radial velocity profiles across the reaction space for the system gas faster than liquid.
Figure 25:
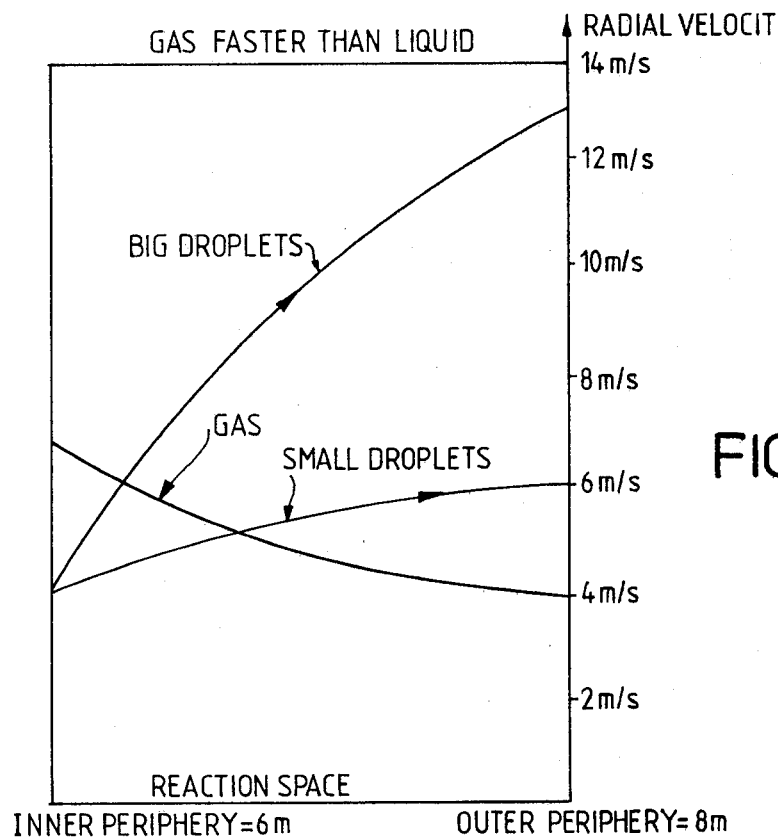

FIGS. 22 and 24 show as an example the tangential velocity profiles for the gas and for the liquid shower across the reaction space (between r=6 m and r=8 m) in a fixed, vertical and radial, geometrical plane.

The tangential velocity components have the same direction for the gas and the liquid.

Diagrams 23 and 25 show as an example the radial velocity profile for the gas and for the liquid shower across the reaction space between r=6 m and r=8 m in a fixed, vertical and radial geometrical plane.

The radial velocity components for the gas and the liquid are of opposite direction.

As neither the gas nor the liquid at any point in the reaction space has a purely radial velocity, these diagrams do not represent any trajectories of any molecules of gas or of any droplets of liquid within the contact zone. They only indicate the velocity profile in the reaction space for the gas and for the liquid in a vertical and radial, geometrical plane.

In order to assist understanding of the invention, dimensional data and operating parameter are set out below for different sizes of an embodiment of rotary gas washer such as described above with reference to FIG. 1. Table 1 relates to a washer of larger capacity than Table 2 and, in each case, the data in column A derives from a system liquid rotating faster than gas and the data in column B from a system of gas rotating faster than liquid.

TABLE 1

| | | A | B |
|---|---|---|---|
| 1. Capacity (Spec. w. of gas 1,3 kg/Nm³) | Nm³/h | 1.045.000 | 1.045.000 |
| 2. Capacity | Nm³/s | 290 | 290 |
| 3. Capacity | CFM | 615.000 | 615.000 |
| 4. Quantity of washing liquid | kg/Nm³gas | 1.3 | 1.3 |
| 5. Quantity of washing liquid | kg/s | 377 | 377 |
| 6. Outer radius of rotor | m | 6 | 6 |
| 7. Outer radius of contact zone | m | 8 | 8 |
| 8. Height of wings | m | 1.1 | 1.1 |
| 9. Inner height of contact zone | m | 1.1 | 1.1 |
| 10. Outer height of contact zone | m | 1.4 | 1.4 |
| 11. Number of revolutions of rotor | rev/s | 1.06 | 0.93 |
| 12. Peripheral velocity at outer ends of wings | m/s | 40 | 35 |
| 13. Centrifugal force at outer ends of wings | g | 27.2 | 20.8 |
| 14. Peripheral velocity of gas at outer periphery of contact zone | m/s | 20 | 50 |
| 15. Centrifugal force acting upon gas at outer periphery of contact zone | g | 5.1 | 31.9 |
| 16. Radial velocity of gas at outer periphery of contact zone | m/s | 4.1 | 4.1 |
| 17. Radial velocity of gas at inner periphery of contact zone | m/s | 7.0 | 7.0 |
| 18. Vertical velocity of gas above wings | m/s | 4.0 | 4.0 |
| 19. Kinetic energy in gas at outer periphery of contact zone | kw | 75.4 | 471 |
| 20. Kinetic energy in liquid at inner periphery of contact zone | kw | 301.4 | 230.8 |

TABLE 2

| | | A | B |
|---|---|---|---|
| 1. Gas Capacity (Spec. w. of gas 1.3 kg/Nm³ | Nm³/h | 115.000 | 115.000 |
| 2. Gas capacity | Nm³/s | 31.9 | 31.9 |
| 3. Gas capacity | CFM | 67.700 | 67.700 |
| 4. Quantity of washing liquid | kg/Nm³gas | 1.3 | 1.3 |
| 5. Quantity of washing liquid | kg/s | 41 | 41 |
| 6. Outer radius of rotor | m | 2 | 2 |
| 7. Outer radius of contact zone | m | 3.5 | 3.5 |
| 8. Height of wings | m | 0.36 | 0.36 |
| 9. Inner height of contact zone | m | 0.36 | 0.36 |
| 10. Outer height of contact zone | m | 0.41 | 0.41 |
| 11. Number of revolutions of rotor | rev/s | 2.39 | 1.59 |
| 12. Peripheral velocity at outer ends of wings | m/s | 30 | 20 |
| 13. Centrifugal force at outer ends of wings | g | 45.9 | 20.4 |

TABLE 2-continued

| | | A | B |
|---|---|---|---|
| 14. Peripheral velocity of gas at outer periphery of contact zone | m/s | 15 | 35 |
| 15. Centrifugal force acting upon gas at outer periphery of contact zone | g | 6.5 | 35.7 |
| 16. Radial velocity of gas at outer periphery of contact zone | m/s | 3.6 | 3.6 |
| 17. Radial velocity of gas at inner periphery of contact zone | m/s | 7.0 | 7.0 |
| 18. Vertical velocity of gas above wings | m/s | 4.0 | 4.0 |
| 19. Kinetic energy in gas at outer periphery of contact zone | kw | 4.66 | 25.4 |
| 20. Kinetic energy in liquid at inner periphery of contact zone | kw | 18.6 | 8.3 |

What I claim is:

1. A rotary gas washer comprising a casing in which is arranged a droplet generator including a ring of radially extending blades or wings mounted for rotation about a vertical axis and means for distributing liquid over the surfaces of the wings or blades so that during rotation liquid is accelerated by the blades and flows to the peripheral edge of the surfaces from where it is shed to form streams of liquid droplets, a gas inlet scroll for directing the inlet gas to flow around the generator with a radially inward component of velocity and having a height adjacent the generator substantially equal to the axial height of the generator, and a gas outlet scroll having an inlet directly above the inlet scroll and connected thereto by a vertical duct having approximately the same diameter as said ring of blades or wings, wherein the radially innermost portion of the peripheral wall of the inlet scroll is spaced from the periphery of the generator by a predetermined minimum distance to provide around the generator an annular reaction space within the scroll for interaction between the shower of droplets and the gas.

2. A rotary gas washer according to claim 1 wherein the ring of wings or blades is mounted upon a rotor and acts to distribute liquid in the form of streams of liquid droplets, to another rotor surrounding the first.

3. A rotary gas washer according to claim 1 wherein the outer periphery of the annular reaction space is defined by a barrier to the outward flow of liquid droplets, which has openings to admit the said flow of gas having radially inward and tangential components of velocity.

4. A rotary gas washer according to claim 3 wherein the barrier comprises a ring of guide vanes, the vanes in the ring being spaced so as to provide openings for the flow of gas equally spaced at intervals around the annular reaction space.

5. A rotary gas washer according to claim 1 several concentric cylinders are arranged coaxially within the vertical duct to divide the duct into a plurality of annular passages communicating between the inlet and outlet scrolls.

6. A rotary gas washer according to claim 1 wherein the width of the reaction space is at least 20% of the radius of the generator.

7. A rotary gas washer according to claim 1 or 6 wherein the distance between the wings of the radially outer periphery of the ring is at least 20 mm for each meter length of the radius of the generator.

* * * * *